A. CARLSON.
WIND WHEEL ELECTRIC GENERATOR.
APPLICATION FILED AUG. 9, 1909.
967,325.
Patented Aug. 16, 1910.
2 SHEETS—SHEET 1.
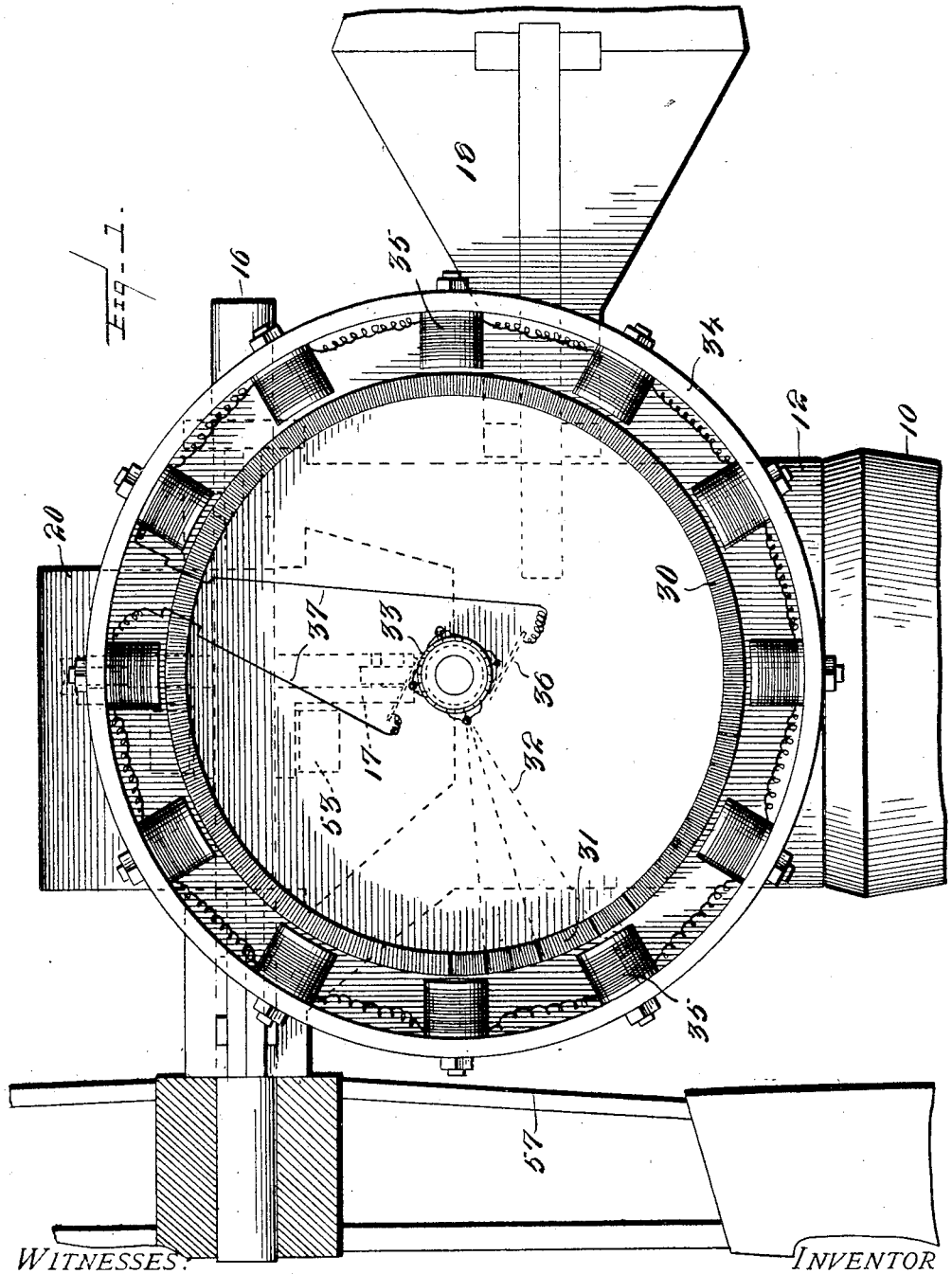
WITNESSES
INVENTOR
Alfred Carlson.
BY
Attorney A. CARLSON.
WIND WHEEL ELECTRIC GENERATOR.
APPLICATION FILED AUG. 9, 1909.
967,325.
Patented Aug. 16, 1910.
2 SHEETS—SHEET 2.
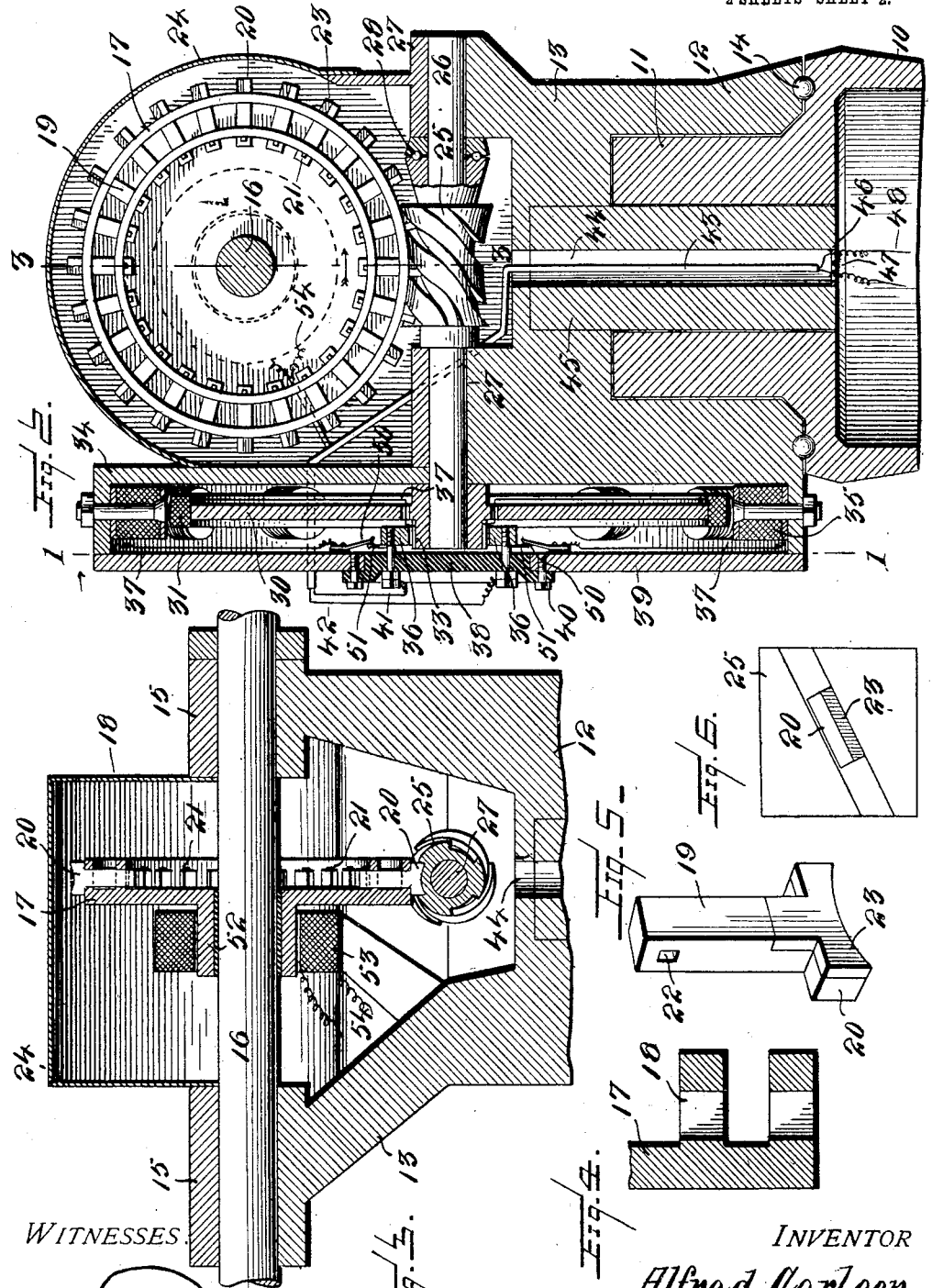
WITNESSES
INVENTOR
Alfred Carlson.
BY
Attorney

UNITED STATES PATENT OFFICE.

ALFRED CARLSON, OF KLAMATH FALLS, OREGON.

WIND-WHEEL ELECTRIC GENERATOR.

967,325.

Specification of Letters Patent. Patented Aug. 16, 1910.

Application filed August 9, 1909. Serial No. 511,917.

*To all whom it may concern:*

Be it known that I, ALFRED CARLSON, citizen of the United States, residing at Klamath Falls, county of Klamath, State of Oregon, have invented certain new and useful Improvements in Wind-Wheel Electric Generators, of which the following is a specification, reference being had therein to the accompanying drawing.

This invention relates to a windwheel electric generator and particularly to means for transmitting motion from the wind wheel to an electrical generating apparatus.

The invention has for an object to provide a novel and improved construction of electric generator driven from a windwheel and electrically connected to magnetically charge parts of the power transmitting mechanism.

Other and further objects and advantages of the invention will be hereinafter fully set forth and the novel features thereof defined by the appended claims.

In the drawing:—Figure 1 is a vertical section on line 1—1, Fig. 2; Fig. 2 is a similar view at a right angle thereto; Fig. 3 is a vertical section on line 3—3, Fig. 2; Fig. 4 is a detail section of the tooth socket of the transmitting wheel; Fig. 5 is a detail perspective of the tooth disposed in this socket, and Fig. 6 is a diagram of the tooth having magnetic and nonmagnetic faces.

Like numerals refer to like parts in the several views of the drawing.

The numeral 10 designates the base of the wind wheel which may be mounted upon any desired tower or other structure and is formed with the projection 11 which is embraced by the sleeve 12 depending from the head 13. These parts are mounted for free rotation by means of the ball bearings 14. The upper portion of the head is provided with bearings 15 for the shaft 16 of the wind wheel 57, and this head has also secured thereto the tail or vane 18 by which it is retained in proper position relative to the direction of the wind.

The shaft 16 is provided with a transmitting wheel 17 secured thereto and formed with a series of sockets 18 upon one face thereof adapted to receive the shanks 19 of the teeth 20 which are secured in the sockets by means of the cross pin 21 extending through the aperture 22 of the shank. These teeth are formed of magnetic material, but have a face 23 of nonmagnetic material in order to facilitate their operation as hereinafter described. The wheel 17 may be inclosed by any desired form of casing as shown at 24 and is adapted to mesh with a worm gear 25 disposed upon the shaft 26 which is mounted in bearings 27 upon the head 13. The worm wheel 25 is secured to this shaft and is provided with ball bearings at one end to resist the end thrust due to the action of the transmitting wheel thereon.

At one end of the shaft 26 an armature wheel 30 is provided which has thereon a winding 31 divided into sections and connected by conductors 32 with the sections of a commutator 33, as shown in Fig. 1. The casing 34 surrounds this wheel and is provided with a series of field magnets 35 connected in series with each other, as shown in Fig. 1 and also with the armature brushes 36 by means of the lines 37, as shown in Fig. 1. The brushes 36 are carried by the removable insulated plate 38 which is secured to the cover 39 of the casing 34 so as to inclose and protect the parts of the generator. This plate 38 is retained in position by means of the screws 40 and carries posts 41 upon which the brushes 36 are mounted. The current generated is conducted from these posts by means of lines 42 in any desired manner, for instance, by means of an inclosing insulation 43 extending downward through an aperture 44 through the depending tube 45 carried by the head 13. In order to permit a rotative movement of this head the wires are separated at the lower end of the head and provided with contacts 46 which rest upon plates 47 from which conducting wires 48 extend, as shown in Fig. 2. The casing cover 39 is provided with contact springs 50 with which the conductor 37 from the field magnets is connected. In order to permit the convenient removal of the plate 38 for access to the armature the posts of this plate have secured thereto a spring 51 which normally engages the spring 50 in order to secure circuit therethrough. The hub 52 of the transmitting wheel is insulated from shaft 16 and provided with a magnetic winding 53 adapted to be charged through the line 54 by a shunt or other current arranged for that purpose. It will therefore be seen that the invention embodies a novel and improved structure by which the power transmitted from a wind wheel may be converted into electrical energy and this effected by means of an ordinary windwheel with which the parts of the generating device are connected.

In the operation of the invention the vane retains the wheel in proper position relative to the wind which also rotates the shaft by which the driving function is performed. The wind wheel shaft is provided with a transmitting wheel the teeth of which are disposed to coöperate with the worm gear upon the shaft of the armature wheel. These teeth are provided at the front with a nonmagnetic face, while the rear face thereof is magnetized from the coil upon the hub of the transmitting wheel and thus attracts the walls of the grooves in the screw on the armature shaft so as to secure a positive driving action between the parts, while the nonmagnetic face of the tooth prevents attraction of that face thereof and the consequent frictional resistance which would result therefrom. The power transmitted to the armature wheel greatly increases the relative rotation thereof to that of the wind wheel and thus secures the generation of the desired electrical energy which may be used or stored as desired. The driving connections by which the power from the wind wheel shaft is transmitted to the armature shaft prevent and equalize any vibration of the wind wheel or irregularity in its rotation as the speed of the armature shaft is greater than the wheel shaft and its momentum produces a continuous rotation thereof so long as driving power is applied thereto.

Having described my invention and set forth its merits, what I claim and desire to secure by Letters Patent is:—

1. In an electric generator, a rotatably mounted head, a driving shaft mounted therein and provided with a driving gear, a countershaft disposed at an angle to said driving shaft and provided with a coöperating worm gear, an armature disk carried by one end of said countershaft, and a casing secured to said head to inclose said disk and provided with a series of field magnets coöperating with said armature.

2. In an electric generator, a rotatably mounted head, a driving shaft mounted therein, a casing secured to said head and provided with a series of field magnets therein, an armature disposed upon said shaft to coöperate with said field magnets, a cover plate for said casing provided with an insulated portion, commutator brushes carried by said portion, contact springs carried by said brushes, and coöperating springs insulated from the cover and connected in circuit with said field magnets.

3. In an electric generator, a rotatively mounted head, a driving shaft mounted therein and provided with a gear, a countershaft disposed at an angle to said driving shaft and provided with a coöperating worm gear, a casing secured to said head and provided with a series of field magnets therein, an armature disposed upon said countershaft to coöperate with said field magnets, a cover plate for said casing provided with an insulated portion, commutator brushes carried by said portion, contact springs carried by said brushes, and coöperating springs insulated from the cover and connected in circuit with said field magnets.

In testimony whereof I affix my signature in presence of two witnesses.

ALFRED CARLSON.

Witnesses:
LESLIE ROGERS,
ALEX MARTIN, Jr.